Patented Nov. 13, 1934

1,980,543

UNITED STATES PATENT OFFICE 1,980,543

WETTING AGENTS

Eli Lurie, New York, N. Y.

No Drawing. Application June 13, 1931,
Serial No. 544,293

11 Claims. (Cl. 260—159)

This invention relates to the production of agents capable of wetting fabrics, such as cotton and wool, hair, sulphur, felt, and such other materials in which a wetting out action is desirable. This invention comprises a new series of wetting agents, a method of preparation thereof and a method of treating materials therewith.

I have determined that highly effective wetting agents may be produced by a method including the reaction between naphthalene and chlorides of aryl or alkyl nature, which are caused to react in the presence of catalytic amounts of aluminum chloride. The reaction product is then sulphonated and the sulphonated material may be converted into the alkali metal salt which is used for the treatment of fabrics and other materials by causing a solution thereof to come in contact with the fabric or other material.

Example 1

As an example of the operation of my process, I may take 64 grams of naphthalene and 107 cc. of tertiary butyl chloride and add thereto ½ gram of anhydrous aluminum chloride in small portions causing a rapid evolution of hydrochloric acid at room temperature. After the mixture solidifies, it is heated at 100° C. until no more hydrochloric acid is evolved, and the oily liquid thus produced is poured into water where it solidifies to a greenish solid. This may be purified by recrystallization from ethyl alcohol, producing a mixture of two solids, each of which may be sulphonated but ordinarily I prefer to sulphonate the mixture.

To 5 grams of this mixture there is added 5 cc. of 98 per cent sulphuric acid and the mixture heated at 100° C. for one hour and then at 130° C. for one hour. After cooling, the black product is poured into 40 cc. of water and neutralized with caustic soda solution. The resulting solution is evaporated to dryness giving a dark gray solid having excellent wetting properties for wool and cotton.

The sulphonation may be carried out by adding to two grams of the above mixture, 1.5 cc. of oleum (containing 20 per cent excess $SO_3$) and heating for two hours at 100° C. The brownish red viscous mass is poured into 25 cc. of water and heated to boiling. On cooling a gray solid is precipitated to which 25 cc. of water is added and the mixture neutralized with caustic soda solution. The solution is evaporated to dryness and dried at 100° C. giving a light yellow product which is found to be an excellent wetting agent for wool and cotton.

Example 2

As another example of the production of wetting agents, I take 64 grams of naphthalene and 107 grams of tertiary amyl chloride and add gradually ½ gram of anhydrous aluminum chloride causing a rapid evolution of hydrochloric acid. The reaction product is heated on a steam bath until no more hydrochloric acid is evolved and the oil is poured into water. To 10 grams of the product is added 8 cc. of oleum at room temperature resulting in the formation of a black tarry mass, the reaction being complete within two hours. On standing, a black liquid and a black tar separate out. The black tar is dissolved in 100 cc. of water, 10 cc. of 3 per cent solution of hydrogen peroxide are added and the mixture heated to remove the odor of $SO_2$.

The solution is neutralized with caustic soda solution and on standing a brown yellowish like solid separates from the brown solution. The solid is filtered off and dried at 100° C. giving a light brown product which upon test was found to be an effective wetting agent for cotton and wool. The brown solution was evaporated to dryness and the solid dried at 100° C. The product also proved to be an excellent wetting agent for cotton and wool and the two products when mixed proved to be at least equal of the best wetting agents previously known.

The black liquid, which separates from the tar obtained in the aluminum chloride reaction, is neutralized with caustic soda solution, evaporated to dryness and tested, is found to be an effective wetting agent.

Example 3

As an alternative sulphonation, 10 grams of the aluminum chloride reaction product of naphthalene and tertiary amyl chloride is treated with 12 cc. of oleum at room temperature. To the black tarry mass is added 100 cc. of water and 5 cc. of 3 per cent solution of hydrogen peroxide, and heated to boiling and then neutralized with caustic soda solution. The reddish brown solution is evaporated to dryness and the product dried at 100° C. Upon test this proved to be an excellent wetting agent.

If this product is purified by extraction with 95 per cent alcohol (ethyl) and the alcohol evaporated, the wetting agent is greatly improved in efficiency and is at least equal of the best wetting agent heretofore known.

Although I have described my invention setting forth a single embodiment thereof, my invention is not limited thereto. It contemplates broadly the use of aryl chlorides such as chlor benzol and the like, and the alkyl chlorides of 4 or more carbon atoms but not over 16 carbon atoms and preferably 5 to 8. The procedure in the making of the wetting agents may be varied considerably from that described, all of which is contemplated by the present invention.

I am not limited to the use of alkali metal salts, but may use free acids of the sulphonated products. It is not necessary to start with pure raw materials, and I have found that crude naphthalene, crude organic halides or mixtures of halides and crude aluminum chloride are perfectly satisfactory for my purpose. The products may be used in acid, basic or neutral solutions for imparting wetting properties thereto. The composition described above may be used to replace Twitchell reagents for the saponification of fats. They may be used as emulsifying agents for water-insoluble substances for various purposes, for example, in paint composition.

The wetting properties of my new compositions may be greatly increased by the addition thereto of small amounts of surface active materials, such as pine oil, cresylic acid, aldol, terpineol, Turkey red oils and the like. My compositions when added to soaps in relatively small amounts cause a large increase in their cleaning properties. I have also found that the addition of other wetting agents, such as have been known, also increases to some extent the cleaning properties of soaps.

Instead of using tertiary halides, I may use secondary and even normal halides in the manufacture of my wetting agents. Some of the products have greater effectiveness than others, but the invention is not to be limited to the most effective compounds and the scope of the invention is set forth in the claims appended hereto. By the term "aryl" I do not intend to include heterocyclic compounds but I confine myself to carbocyclic ring structures.

What I claim is:

1. A method which comprises treating naphthalene with a halide of the class consisting of aryl and alkyl compounds in the presence of catalytic amounts of aluminum chloride and sulphonating the resulting product.

2. A method which comprises treating naphthalene with two molecular amounts of a halide of the class consisting of aryl and alkyl compounds in the presence of catalytic amounts of aluminum chloride and sulphonating the resulting product.

3. A method which comprises treating naphthalene with a halide of the class consisting of aryl and alkyl compounds in the presence of catalytic amounts of aluminum chloride, heating to complete the reaction and sulphonating the resulting product.

4. A method which comprises treating naphthalene with a halide of the class consisting of aryl and alkyl compounds in the presence of catalytic amounts of aluminum chloride, heating to above 100° C. to complete the reaction and sulphonating the resulting product.

5. A method which comprises treating naphthalene with an alkyl halide of 4 or more carbon atoms in the presence of catalytic amounts of aluminum chloride and sulphonating the resulting product.

6. A method which comprises treating naphthalene with a non-normal alkyl halide of 4 or more carbon atoms in the presence of catalytic amounts of aluminum chloride and sulphonating the resulting product.

7. A method which comprises treating naphthalene with a tertiary alkyl halide of 4 or more carbon atoms in the presence of catalytic amounts of aluminum chloride and sulphonating the resulting product.

8. A method which comprises treating naphthalene with tertiary amyl chloride in the presence of catalytic amounts of aluminum chloride and sulphonating the resulting product.

9. A method which comprises treating naphthalene with an alkyl halide of from 4 to 16 carbon atoms in the presence of catalytic amounts of aluminum chloride and sulphonating the resulting product.

10. A method which comprises treating naphthalene with an alkyl halide of from to 5 to 8 carbon atoms in the presence of catalytic amounts of aluminum chloride and sulphonating the resulting product.

11. A method which comprises treating naphthalene with an aryl-alkyl halide in the presence of catalytic amounts of aluminum chloride and sulphonating the resulting product.

ELI LURIE.